3,819,795
PROCESS FOR MOLDING PLASTIC-COVERED
GOLF BALLS
Frank S. Martin, Cranston, and James F. Little, Greenville, R.I., assignors to Uniroyal, Inc., New York, N.Y.
No Drawing. Filed Dec. 29, 1971, Ser. No. 213,495
Int. Cl. B29d 3/00
U.S. Cl. 264—248      13 Claims

ABSTRACT OF THE DISCLOSURE

A method of making a golf ball wherein thermoplastic material is heated and formed into first and second hemi- possessing excellent impact resistance, resistance to cut- the first shell and the second shell is placed thereover so that two shells meet at the equator of said shells. The shells are then molded to form a golf ball.

The present invention relates to a process of preparing a golf ball having a cover which is flexible while also possessing excellent impact resistance, resistance to cutting, toughness easy processability and good "click" characteristics.

The golf ball, made in accordance with the instant invention comprises a core which may be a solid molded sphere or which may consist of a solid or liquid center about which is wound a rubber thread and a cover made from a thermoplastic material which encloses the core.

One prior art method of making such a ball is to place the core within two preformed hemispherical shaped half shells of thermoplastic cover stock material which are placed adjacent to one another so as to enclose the core completely such that the cross section of the resultant assembly is generally circular or elliptical in shape. The aforesaid cover-core assembly is put into a mold in a press which optionally may have been preheated whereupon the press is completely closed and sufficient additional heat applied for a time long enough for the thermoplastic cover stock material to flow so as to completely conform to the mold cavity. The press is then cooled and the ball removed from the mold and the usual finishing procedures are applied.

One disadvantage of a method as just described is that the core of the golf ball may be distorted as the mold containing the cover core assembly is closed. The compressing action of the closing molds will distort the core unless the cover material is fluid enough to be redistributed in the mold. Another difficulty which is encountered in the prior art method is that the ball ultimately formed may have rubber threads extending through the cover, producing what is known in the trade as a "thread ball." A thread ball is the result of closing the mold on the assembly containing a thread-wound core, whereupon the core may become distorted so much that the wound rubber threads are exposed and/or protrude through the cover. Further problems associated with the prior art method noted for making this type of ball is that the size and shape of the cover half shells must be controlled within very narrow limits or the problems noted become exaggerated. Furthermore, in the prior art method there is a chance to trap air in the mold which in turn forms blisters and air pockets on the surface of the ball.

Another disadvantage is that the heat which must be applied in order to make the cover material flow is enough to cause deterioration of the thread winding.

The importance of heat transfer in molding according to the prior art cannot be overemphasized. If the material to be used as the cover of a ball is cool when placed in either a hot or cold mold, there must be enough time before complete mold closure to soften the cover material. If the cover stock is not softened enough, the core is consequently compressed and has no place to go, so it is distorted around its equator.

The method of preparing a golf ball in accordance with the present invention comprises the steps of initially placing a first quantity of a thermoplastic material as described hereinafter in any convenient form into an upwardly open optionally preheated lower mold cavity contained in a lower mold member, which may be the standard mold plate used in the conventional golf ball platen press. An intermediate mold member, preferably a center plate having a first projection extending upwardly and a second projection extending downwardly therefrom in registry with said first projection, is placed over said lower mold member with said second projection extending into said lower mold cavity over the thermoplastic material contained therein. A second quantity of the same thermoplastic material is placed onto said first projection of said intermediate mold member and above said thermoplastic material on said first projection is positioned a downwardly open also optionally preheated upper mold cavity defined by an upper mold member. This upper mold member is the top mold plate which is located opposite the lower mold member in the conventional platen press noted above. The configuration of the surface of both of the mold cavities is not critical and is generally such that the surface of the ball will have the usual patterned or dimpled appearance as a result of being formed therein. The upper and lower mold members are heated to a given first temperature, if the cavities have not been preheated and the intermediate mold member is heated to a second temperature lower than said first temperature, said second temperature being at least equal to the softening temperature of said thermoplastic material. The softening temperature of the thermoplastic material should preferably not exceed 400° F. if wound rubber cores are to be used as this temperature may have a detrimental effect on the rubber in said cores which would result in a detrimental effect on the rubber in said cores which would result in a poorer quality ball. Solid cores may be utilized if the softening temperature of the thermoplastic exceeds about 400° F. The upper and lower mold members are moved toward each other with said cavities in registry with one another and with said projections, in order to press the first quantity of thermoplastic material in said lower mold cavity between the lower mold member and the second projection of said intermediate mold member, and to press the second quantity of thermoplastic material in the upper cavity between the upper mold member and the first projection of said intermediate mold member. This forms an upper molded cover half in the upper cavity and a lower molded cover half in the lower cavity. The cover halves are maintained in the respective mold cavities as a result of the dimples formed by the mold and the tackiness of the heated plastic while relatively moving the upper and lower mold members away from each other. The intermediate mold member is removed from between the upper and lower mold members while maintaining molded said cover halves in the respective cavities, and a solid core or a wound core with a solid or liquid center is placed into substantially the center of the lower molded cover half in said lower cavity. The upper and lower mold members are moved toward one another and pressed together and maintained at said first temperature for a sufficient period of time generally from 30 to 120 seconds so as to form the upper and lower cover halves into a substantially continuous cover around said core. The upper and lower mold members are cooled while the mold members are still in contact to a temperature below the softening temperature of said thermoplastic material. Throughout the process the upper and lower mold cavities are maintained at substantially the same temperature. Thus temperature at which the cover halves are molded is substantially identical to the temperature at which the ball is formed.

Descriptive terms such as "upper," "lower" included in the aforesaid general disclosure of the invention are used by way of illustration and in no way should be construed to be limiting the invention or the manner in which it operates.

More specifically the process used for making a golf ball in accordance with the present invention may also include molding a preform from a thermoplastic material at a relatively high temperature. The shape of the preform is not especially critical. It can conveniently be the shape of the shells normally used in the golf ball industry for molding balata covers on golf balls. The preferred preform is a shell approximately hemispherical in shape with the thickness being greater at the pole of the hemisphere (than at the equator) to allow for stock flow during molding. If desired, a small knob can be placed on the outside of the shell at the pole of the hemisphere to prevent air trapping at this point during mold closure. The weight of the shell is not critical but should be great enough to allow for adequate stock flow to effect knitting at the equator during ball molding. Shells allowing about 50% overflow have successfully been used. The temperature at which the shell is molded is critical. It must be substantially above the temperature used in the final molding of the cover around the golf ball core. The temperature used will obviously be a function of the particular thermoplastic material used in the cover. For example, with Surlyn which is an ionomer defined as a thermoplastic copolymer of ethylene and a vinyl monomer with an acid group such as methacrylic or carboxylic acid, a molding temperature in the order of about 400° F. can be used. The purpose of the high temperature during the shell forming stage is to remove most of the elastic memory from the shell. If the elastic memory is not removed from the shell, it will shrink and become distored in the subsequent shell preheating step. The method of molding is immaterial as it can be injection molded, transfer molded or compression molded provided that sufficiently high temperatures are used to insure that the shell is substantially free from strains and elastic memory.

The preferred method in the present invention is to use a pair of shells fabricated in accordance with the disclosure noted above, wherein one shell is pressed into each half of a mold cavity, held in place, and heated to the temperature desired for molding the shell onto the golf ball core. The preheating of the shell can be done in any convenient manner. A preferred way is to have a center plate with a knob on each side which can press the upper and lower shells snugly into the golf ball mold when the mold is closed with the center plate in position. The shells are held in place in the mold cavities and maintained therein at the desired temperature until the two shells are uniformly heated throughout to form a molded cover half. Again, the temperature for molding will be dependent upon the particular thermoplastic used as the cover. With Surlyn, using a hot press, the shell preheating takes about 90 seconds at a temperature of bewteen about 250° F. and 300° F.

After the shell preheating step, the press is opened, the center plate is removed, leaving the molded cover halves in their respective mold cavities; the standard wound or solid core used in the prior art is placed substantially in the center of the lower molded cover half, and the mold is closed. Preferably the actual closure of the mold should be as rapid as possible until the core makes contact with the molded cover halves in the upper mold cavity. At this point the closure is slowed down and allowed to proceed slowly so that any excess stock can flow around the core without developing enough pressure to burst or distort the core. Using Surlyn as the cover material at 280–300° F., the slow closure phase typically takes between 10 and 20 seconds. In any specific case, the total closing time is determined by the time required for all excess stock to flow out without core distortion to give the ball its proper size. After the two mold halves make metal-to-metal contact, the full mold-clamping pressure is applied. After the full clamping pressure is reached, heat is applied for approximately 35 to 50 seconds. This heating at full pressure allows the thermoplastic cover material to flow into the interstices of the wound rubber core when one is used, this provides a strong bond between the cover and the core. Thereafter the ball in the mold is cooled as rapidly as possible. Any convenient method may be used to cool the ball in the mold.

As soon as the ball has been cooled sufficiently so that the cover will not be distorted when the mold is opened, the mold is opened and the ball removed. The time of cooling will, of course, depend greatly upon the temperature of the cooling medium and the geometry of the molding press. In any case, the cooling should be as rapid as practical. After molding, the ball may then be processed in any desired manner to prepare it for sale.

The procedure described above can be used advantageously with any thermoplastic material and could even be used with materials which are thermoplastic while being molded but which cure subsequently. Although the process of the present invention is operative with any thermoplastic material as noted above, it should be emphasized that certain thermoplastic materials such as polystyrene will not have the properties needed in a top quality golf ball to be used in competition, however such materials can be used to form range balls, novelty golf balls or display golf balls etc. Particularly effective thermoplastic materials which can be used in the present invention are polyethylene, polypropylene, and a copolymer of an alkylene compound such as ethylene, propylene or butylene and acryllic or methacrylic acid. The acid portion of the copolymer may be in free acid form, partially converted to a salt or fully converted to a salt. Any of the monovalent or divalent elements of Groups I and II of the Periodic Table can be used to form the cation of the salt in the copolymer. However, the monovalent metals such as sodium or potassium are preferred to divalent metals such as zinc because the monovalent metals possess better physical properties. The acid portion of the copolymer is preferably about 5–20% by weight of copolymer. A more complete disclosure of these copolymers is found in U.S. Pat. 3,264,272 to Richard Rees, the contents of which are hereby incorporated by reference herein. Also useful are the various nylons presently available, thermoplastic ployurethanes, polycarbonates, polysulfones and balata.

The advantages of using the present invention are that the possibility of forming a distorted core or a thread ball is virtually eliminated because the presoftened cover material easily flows during mold closure and any excess moves out at the flash line before complete mold closure. The thread of the core is subjected to a minimum amount of heat which is a very advantageous situation because heat tends to relax the rubber or it may cause the rubber threads to break and as a result the ball is not as resilient as it otherwise would be. Another advantage is that the exact dimensions on the shell size are not critical as the cover of the ball is actually formed from a soft, free-flowing material in the final molding step. The particular temperatures, times and pressures can be varied depending upon the particular thermoplastic material employed and the amounts thereof.

The following example is submitted to illustrate the process of the present invention.

EXAMPLE

To 100 parts of Surlyn 1559 is added 8.625 parts of a 40/60 Surlyn 1559/$TiO_2$ masterbatch. The above noted materials are thoroughly blended and fed into a screw type injection molding machine. Hemispherical shells are molded by injecting at a temperature between about 380° and 410° F. into a mold at 50°–80° F. A 25–40 second molding cycle is used. The resulting product of this process is referred to as a "preform."

A standard golf ball molding press is used to form the ball and is preheated to between about 250° and 325° F., preferably 280°–300° F. The temperature of the mold is maintained in the aforesaid range throughout the process. The hemispherical shaped preforms are placed in both halves of the mold. A center plate is inserted between the opposing molds to maintain the preforms in proper position in order to form the cover halves. The mold is closed and heat is maintained for 80–100 seconds. Heat is also transferred to the preforms through the center plate which is maintained at a temperature of between 120° and 180° F. The center plate temperatures are kept in this range so that the thermoplastic material does not stick to the center plate. The press is opened and the center plate removed. A core consisting of a rubber-covered liquid center 1.125 inches in diameter which has been wound on a golf ball winding machine to a diameter of 1.575 inches in diameter using rubber thread, is inserted into substantially the center of the bottom mold half and the press is closed rapidly until the top premolded cover half touches the core, then closing is continued at a slow rate so that 10–20 seconds elapse before complete metal-to-metal closure is achieved. This allows excess thermoplastic material to flow out of the mold. The molding temperature is maintained for 30–50 seconds after complete closure to allow the thermoplastic material to flow into the interstices of the core. The ball is cooled in the mold as rapidly as possible. The press is opened and the ball is removed and the usual finishing steps are applied. The ball so made was tested with the following results:

| | |
|---|---|
| PGA compression | 75–85 |
| Percent rebound | 68–70 |
| Initial velocity ft./sec. | 249–251 |

What we claim and desire to protect by Letters Patent is:

1. A method of making a golf ball comprising the following steps: placing a first shell, which is substantially hemispherical in shape and which has been preformed from a thermoplastic material at a temperature sufficient to substantially remove internal strains therefrom, into an upwardly open lower mold cavity defined by a lower mold member, providing an intermediate mold member having a first projection extending upwardly and a second projection extending downwardly therefrom in registry with said first projection, placing said intermediate mold member over said lower mold member with said second projection extending into said lower mold cavity over the interior of said first shell therein; placing the interior of a second shell which is substantially hemispherical in shape and which has been preformed from a thermoplastic material at a temperature sufficient to substantially remove the internal strains therefrom onto said first projection of said intermediate mold member; positioning above said second shell on said first projection a downwardly open upper mold cavity defined by an upper mold member; heating said upper and lower mold members to a given first temperature, heating said intermediate mold member to a second temperature lower than said first temperature, said second temperature being at least equal to the softening temperature of said thermoplastic material comprising said first and second shells, relatively moving said upper and lower mold members toward each other with said cavities in registry with one another and with said projections for pressing said first shell in said lower mold cavity between said lower mold member and said second projection of said intermediate mold member, and for pressing said second shell in said upper cavity between said upper mold member and said first projection of said intermediate mold member for forming an upper molded cover half in said upper cavity and a lower molded cover half in said lower cavity, maintaining said cover halves in the respective mold cavities while relatively moving said upper and lower mold members away from each other, removing said intermediate mold member from between said upper and lower mold members while maintaining said cover halves in the respective cavities placing a core into the lower molded cover half in said lower cavity, relatively moving said upper and lower mold members toward one another and relatively pressing said upper and lower mold members against one another while maintaining them substantially at said first temperature so as to form said upper and lower cover halves into a substantially continuous cover around said core, and cooling said upper and lower mold members while said mold members are still in contact with one another to a temperature below the softening temperature of said thermoplastic material.

2. The method of making the golf ball defined in claim 1 wherein said substantially hemispherical shell has greater thickness at the pole than at the equator.

3. The method of making the golf ball defined in claim 2 wherein said hemispherical shell has been premolded at a temperature substantially greater than said given first temperature.

4. The method of making the golf ball defined in claim 3 wherein said intermediate mold member is a center plate and said projections extending therefrom are hemispherical in shape and adapted to receive said hemispherical shells.

5. The method of making the golf ball defined in claim 4 wherein said hemispherical shells are heated at said given first and second temperature until said hemispherical shells are uniformly heated throughout.

6. The method of making the golf ball defined in claim 5 wherein said core is placed substantially in the center of said lower mold cavity after said lower molded cover half has been formed.

7. The method of making the golf ball defined in claim 6 wherein after said core has been inserted in said lower mold cavity, said upper and lower members are relatively moved toward each other at a rapid given first rate until said core makes contact with said molded cover half in said upper mold cavity, whereupon said upper and lower mold members are moved relatively toward each other at a given second rate which is substantially less than said first rate to allow excess thermoplastic material in said molds to flow out of said mold cavities.

8. The method of making the golf ball defined in claim 7 wherein full clamping pressure is applied and said first temperature is maintained, after said upper and lower mold members make contact after insertion of said core therein.

9. The method of making the golf ball defined in claim 8 wherein said thermoplastic material is selected from the group consisting of a copolymer of an alkylene compound and acrylic or methacrylic acid wherein the acid portion of said copolymer is in the free acid form partially converted to a salt or fully converted to a salt, polyethylene, polypropylene, nylon and polyurethane.

10. The method of making a golf ball as defined in claim 9 wherein said alkylene compound is ethylene, propylene or butylene.

11. The method of making a gold ball as defined in claim 10 wherein any of the monovalent or divalent elements of Group I or Group II of the Periodic Table are used to form the cation of the salt in said copolymer.

12. The method of making a gold ball as defined in claim 11 wherein the acid portion of said copolymer is 5–20% by weight of copolymer.

13. A method of making a golf ball comprising the following steps: placing a hemispherical shaped shell which has been preformed at between about 380° and 410° F. and is made from a copolymer of ethylene and methacrylic acid into an upwardly open lower mold cavity defined by a lower mold member, providing a center plate having a first hemispherical projection extending upwardly and a second hemispherical projection extending downwardly therefrom in registry with said first projection, placing said center plate over said lower mold member with said second hemispherical projection extending into said lower mold cavity and contacting said hemispherical shaped shell therein; placing a second hemispherical shaped shell of the same thermoplastic material onto said first projection of said center plate; positioning above said hemispherical shaped shell on said first hemispherical projection a downwardly open upper mold cavity defined by an upper mold member; heating said upper and lower mold members to between about 250° and 325° F., heating said center plate to between about 120° and 180° F., relatively moving said upper and lower mold members toward each other with said cavities in registry with one another and with said projections, for pressing said first hemispherical shaped shell in said lower mold cavity between said lower mold member and said second hemispherical projection of said intermediate mold member and for pressing said second hemispherical shaped shell in said upper cavity between said upper mold member and said first hemispherical projection of said center plate for forming an upper molded cover half in said upper cavity and a lower molded cover half in said lower cavity, maintaining said cover halves in the respective mold cavities while relatively moving said upper and lower mold members away from each other, removing said center plate from between said upper and lower mold members while maintaining said cover halves in the respective cavities, placing a core into the lower molded cover half in said lower cavity, relatively moving said upper and lower mold members toward one another and relatively pressing said upper and lower mold members against one another while maintaining them at a temperature between 250° and 325° F. so as to form said upper and lower cover halves into a substantially continuous cover around said core, and cooling said upper and lower mold members while said mold members are still in contact with one another.

References Cited
UNITED STATES PATENTS

| | | | |
|---|---|---|---|
| 711,215 | 10/1902 | Kempshall | 264—248 |
| 1,575,388 | 3/1926 | Roberts | 264—96 |
| 3,147,324 | 9/1964 | Ward | 264—254 |
| 3,350,252 | 10/1967 | Twickler | 264—254 |

ROBERT F. WHITE, Primary Examiner

T. E. BALHOFF, Assistant Examiner

U.S. Cl. X.R.

264—250

UNITED STATES PATENT AND TRADEMARK OFFICE
CERTIFICATE OF CORRECTION

PATENT NO. : 3,819,795
DATED : June 25, 1974
INVENTOR(S) : FRANK S. MARTIN ET AL.

It is certified that error appears in the above-identified patent and that said Letters Patent are hereby corrected as shown below:

Column 6, line 39, after the word "lower" (second occurence) the word -- mold -- should be inserted.

and "polypropylene" and substitute therefor: -- ethylene -- and -- propylene --.

Column 6, line 62, delete "gold" and insert therefor -- golf --.

Column 6, line 66, delete "gold" and insert therefor -- golf --.

Signed and Sealed this

Sixth Day of December 1977

[SEAL]

Attest:

RUTH C. MASON
Attesting Officer

LUTRELLE F. PARKER
Acting Commissioner of Patents and Trademarks